No. 731,971. PATENTED JUNE 23, 1903.
H. C. SWAN.
SHAFT CLAMP.
APPLICATION FILED JAN. 16, 1902.
NO MODEL.
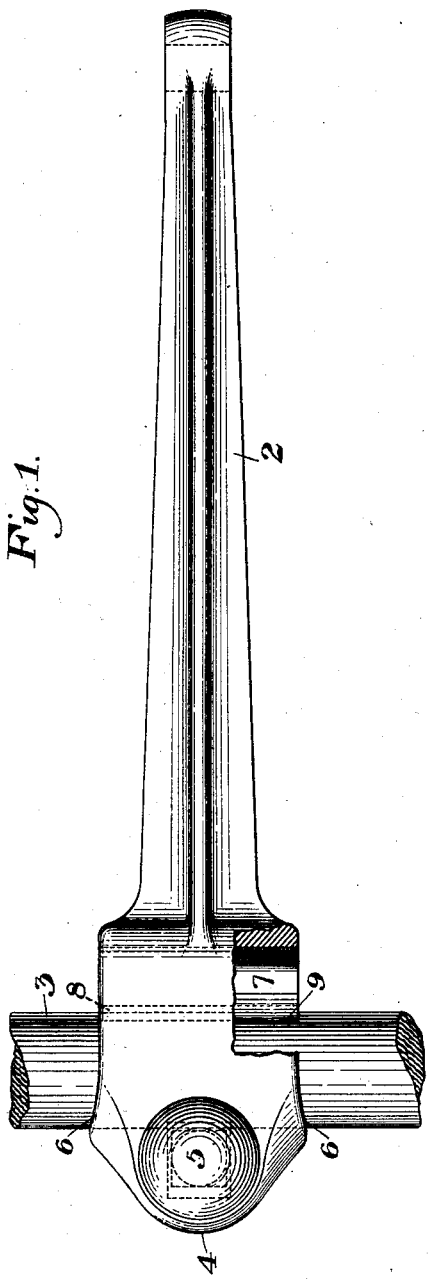
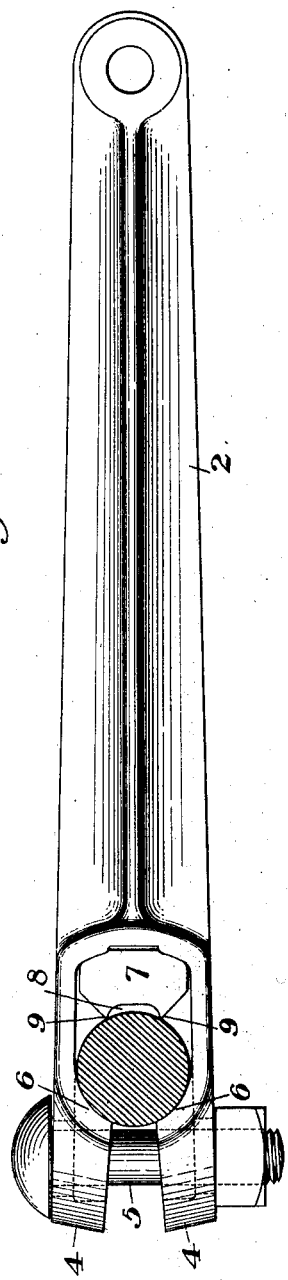
WITNESSES
INVENTOR No. 731,971. Patented June 23, 1903.

UNITED STATES PATENT OFFICE.

HENRY C. SWAN, OF OSHKOSH, WISCONSIN.

SHAFT-CLAMP.

SPECIFICATION forming part of Letters Patent No. 731,971, dated June 23, 1903.

Application filed January 16, 1902. Serial No. 90,046. (No model.)

*To all whom it may concern:*

Be it known that I, HENRY C. SWAN, of Oshkosh, Winnebago county, Wisconsin, have invented a new and useful Shaft-Clamp, of which the following is a full, clear, and exact description, reference being had to the accompanying drawings, forming part of this specification, in which—

Figure 1 is a top plan view of my improved clamp, partly broken away; and Fig. 2 is a side elevation of the same.

My invention relates to the devices employed for clamping or securing an arm to a shaft, and more particularly to that class wherein the shaft extends through an oblong hole formed by forked arms on the lever, which arms are drawn together by a bolt or drawing device at the outer end of the arm; and its object is to provide a new arrangement of the parts whereby an efficient gripping action is obtained upon the shaft.

In the drawings, 2 represents the lever or crank arm, 3 the shaft, 4 4 the forked portions of the lever, and 5 the drawing-bolt for drawing the arms of the forked portions toward each other. The inner faces of the forks are provided with curved portions 6 6, arranged to bear upon the outer portions of the shaft, and at the inner end of the forked recess is a dog or detent 7, having portions arranged to bite upon the shaft. I have shown this dog as loosely inserted and having its face provided with a transverse recess 8, leaving two sharp ridges 9 9 to engage the shaft; but the form of this dog portion may be changed in many ways. In securing the lever or crank arm to the shaft the dog is put in place, the arm slipped on the shaft, and the slightly resilient arms of the forked portion are drawn down by the bolt or other suitable device. As the curved inner faces of the forked arms draw toward each other, they tend to force the shaft toward the dog or if the shaft is stationary to draw the dog and lever-arm toward the shaft, thus causing the sharp ridge portions to engage it and clamp it firmly in place.

The advantages of my invention result from the use of the curved faces which contact with the shaft in connection with the opposite clamping portion or dog against which the shaft is forced, since a quick and remarkably efficient clamping action is obtained.

Many variations may be made in the form and arrangement of the parts without departing from my invention.

I claim—

1. In shaft-clamps, an arm having a forked portion with inner coacting curved faces arranged to contact with the shaft on one side thereof, a clamping-dog arranged to contact with the said shaft on the side opposite to that of the curved faces, and mechanism engaging the forked arms on the same side of the shaft as the curved faces and arranged to force the shaft against the dog on the other side; substantially as described.

2. In shaft-clamps, an arm having a forked portion, the forks having intermediate inner coacting wedging-faces arranged to act upon the shaft at one side thereof, a clamping-dog at the inner end of the fork arranged to engage the side of the shaft opposite to that engaged by the wedge-faces, and a bolt extending through the outer end of the forked arms arranged to draw them together; substantially as described.

In testimony whereof I have hereunto set my hand.

HENRY C. SWAN.

Witnesses:
W. P. CHAMPNEY,
L. CHRISTIE.